US007920538B2

(12) United States Patent
Gerhardt et al.

(10) Patent No.: US 7,920,538 B2
(45) Date of Patent: Apr. 5, 2011

(54) SPECTRAL REUSE TRANSCEIVER-BASED AGGREGATION OF DISJOINT, RELATIVELY NARROW BANDWIDTH (VOICE) CHANNEL SEGMENTS OF RADIO SPECTRUM FOR WIDEBAND RF COMMUNICATION APPLICATIONS

(75) Inventors: Edward Carl Gerhardt, Malabar, FL (US); Paul G. Greenis, Indian Harbour Beach, FL (US); William R. Highsmith, Indialantic, FL (US)

(73) Assignee: Investors Life Insurance Company, Greenwich, CT (US)

( * ) Notice: Subject to any disclaimer, the term of this patent is extended or adjusted under 35 U.S.C. 154(b) by 67 days.

(21) Appl. No.: 11/532,306

(22) Filed: Sep. 15, 2006

(65) Prior Publication Data

US 2007/0019603 A1 Jan. 25, 2007

Related U.S. Application Data

(63) Continuation-in-part of application No. 10/730,753, filed on Dec. 8, 2003.

(60) Provisional application No. 60/784,105, filed on Mar. 20, 2006.

(51) Int. Cl.
*H04J 3/17* (2006.01)
(52) U.S. Cl. .................. 370/343; 370/431; 370/437
(58) Field of Classification Search .................. 370/343, 370/431, 437
See application file for complete search history.

(56) References Cited

U.S. PATENT DOCUMENTS

| | | | |
|---|---|---|---|
| 4,578,815 A | 3/1986 | Persinotti | 455/15 |
| 5,040,238 A | 8/1991 | Comroe et al. | 455/33 |
| 5,199,109 A * | 3/1993 | Baker | 455/161.2 |
| 5,475,677 A | 12/1995 | Arnold et al. | 370/29 |
| 5,475,866 A | 12/1995 | Ruthenberg | 455/33.1 |
| 5,901,357 A | 5/1999 | D'Avello et al. | 455/454 |
| 5,999,818 A | 12/1999 | Gilbert et al. | 455/448 |
| 6,246,713 B1 * | 6/2001 | Mattisson | 375/132 |
| 6,252,910 B1 * | 6/2001 | West et al. | 375/261 |
| 6,301,481 B1 | 10/2001 | Parra | 455/450 |
| 6,304,756 B1 | 10/2001 | Hebeler et al. | 455/450 |
| 6,324,184 B1 | 11/2001 | Hou et al. | 370/468 |
| 6,483,814 B1 * | 11/2002 | Hsu et al. | 370/277 |
| 7,177,294 B2 * | 2/2007 | Chen et al. | 370/338 |
| 2002/0002052 A1 | 1/2002 | McHenry | 455/447 |
| 2002/0085503 A1 | 7/2002 | Hulyalkar et al. | 370/252 |
| 2003/0050012 A1 | 3/2003 | Black et al. | 455/62 |
| 2003/0181213 A1 | 9/2003 | Sugar et al. | 455/454 |
| 2004/0047324 A1 | 3/2004 | Diener | 370/338 |
| 2004/0077366 A1 | 4/2004 | Panasik et al. | 455/514 |

OTHER PUBLICATIONS

Cherubini, Giovanni, *Filtered Multitone Modulation for Very High-Speed Digital Subscriber Lines*, IEEE, vol. 20, No. 5, Jun. 2002, pp. 1016-1028.

(Continued)

*Primary Examiner* — Jason E Mattis
(74) *Attorney, Agent, or Firm* — Michael Cesarano; Feldman Gale P.A.

(57) ABSTRACT

A bandwidth usage control methodology uses the clear channel detection and frequency agile functionality of a spectral reuse transceiver to effectively 'aggregate' disjoint user channels into an overall bandwidth, the spectral extent of which is at least sufficient to meet a high bandwidth requirement (such as, but not limited to the transmission of data/video), that cannot be realized by a conventional, single channel radio.

5 Claims, 1 Drawing Sheet

OTHER PUBLICATIONS

Vangelista, Lorenzo, *Efficient Implementations and Alternative Architectures for OFDM-OQAM Systems*, IEEE members, pp. 1-15.
Dick, Chris, *Implementation of FPGA Signal Processing Datapaths for Software Defined Radios*, Communications Design China, Conference Proceedings, pp. 241-247.
Andraka, Ray, *A Survey of Cordic Algorithms for FPGA Based Computers*, Andrake Consulting Group, 10 pages.
Moonen, Marc, *Per Tone Equalization for DMT Receivers*, Globecom, Rio de Janeiro, Brazil, Dec. 1999, 6 pages.
Wang, Kai, *Time and Frequency Synchronisation in OFDM*, School of Communications and Informatics, Victoria University, Melbourne, Australia, 2 pages.
Zhou, Shengli, *Finite-Alphabet Based Channel Estimation for OFDM and Related Multicarrier Systems*, IEEE, vol. 49, No. 8, Aug. 2001, pp. 1402-1414.
Lee, Donghoon, *A New Symbol Timing Recovery Algorithm for OFDM Systems*, IEEE, 1997, pp. 366-367.
van de Beek, Jan-Jaap, *ML Estimation of Time and Frequency Offset in OFDM Systems*, IEEE, vol. 45, No. 7, Jul. 1997, pp. 1800-1805.
Wyglinski, Alexander M., *Adaptive Filterbank Multicarrier Wireless Systems for Indoor Environments*, Proc. 56$^{th}$ IEEE Vehicular Tech Conf. (Vancouver, BC), Sep. 2002, pp. 336-340.
Saulnier, Gary J., *Performance of an OFDM Spread Spectrum Communications System Using Lapped Transforms*, IEEE, 1997, 5 pages.
Vaidyanathan, P. P., *Filter Banks in Digital Communications*, Dept. of Electrical Engineering, California Institute of Technology, Pasadena, CA, 23 pages.
Ohm, Michael, *Extended Lapped Transforms for Digital Multicarrier Modulation*, Globecom, IEEE Nov. 25-29, 2001, pp. 217-221.
Saulnier, Gary J. *Performance of a Spread Spectrum OFDM System in a Dispersive Fading Channel with Interference*, IEEE, 1998, 5 pages.
Weiss, Stephan, *Fast Implementation of Oversampled Modulated Filter Banks*, Dept. of Electronics, University of Southhampton, 4 pages.
Weiss, Stephan, *Analysis and Fast Implementation of Oversampled Modulated Filter Banks*, Dept. of Electronics, University of Southhampton, 12 pages.
Eneman, Koen, *Para-Unitary Filter Bank Design for Oversampled Subband Systems*, Dec. 1997, rev. Jul. 1998, 31 pages.
Govardhanagiri, Subbarao, *Performance Analysis of Multicarrier Modulation Systems Using Cosine Modulated Filter Banks*, IEEE, 1999, pp. 1405-1408.
*Filtered Multitone Modulation*, IBM Europe, 14 pages.
Schuller, Gerald, *Modulated Filter Bank with Arbitrary System Delay: Efficient Implementations and the Time-Varying Case*, IEEE, vol. 48, No. 3, Mar. 2000, pp. 737-748.
Karp, Tanja, *Modified DFT Filter Banks with Perfect Reconstruction*, IEEE, vol. 46, No. 11, Nov. 1999, pp. 1404-1414.
Heller, Peter, *A General Formulation of Modulated Filter Banks*, IEEE, vol. 47, No. 4, Apr. 1999, pp. 986-1002.
Harteneck, Moritz, *Design of Near Perfect Reconstruction Oversampled Filter Banks for Subband Adaptive Filters*, IEEE, vol. 46, No. 8, Aug. 1999, pp. 1081-1085.
Treichler, J. R., *Practical Implementations of Blind Demodulators*, Applied Signal Technology, Inc. 5 pages.
Knapp, Steven, *Using Programmable Logic to Accelerate DSP Functions*, Xilinx, Inc. 1995, pp. 1-8.
Andraka, Ray, *High Performance Digital Down-Converters for FPGAs*, pp. 48-51.
Doan Vo, Nguyen, *Optimal Interpolators for Flexible Digital Receivers*, McGraw University, 4 pages.
Dick, Chris, *FPGA Interpolators Using Polynomial Filters*, 8$^{th}$ International Conference, Sep. 13-16, 1998, 5 pages.
Barbarossa, Sergio, *Channel-Independent Synchronization of Orthogonal Frequency Division Multiple Access Systems*, IEEE, vol. 20, No. 2, Feb. 2002, pp. 474-486.
Speth, Michael, *Frame Synchronization of OFDM Systems in Frequency Selective Fading Channels*, 5 pages.
Müller, Stefan, *Comparison of Preamble Structures for Burst Frequency Synchronization*, Globecom, San Francisco, CA, Nov. 2000, pp. 1488-1493.
DesBrisay, Greg, *Basics of Orthogonal Frequency Division Multiplexing (OFDM)*, Cisco Systems, Inc., 2000, pp. 1-42.

Zhou, Shengli, *Digital Multi-Carrier Spread Spectrum Versus Direct Sequence Spread Spectrum for Resistance to Jamming and Multipath*, IEEE, vol. 50, No. 4, Apr. 2002, pp. 643-655.
Lambrette, Uwe, *Techniques for Frame Synchronization on Unknown Frequency Selective Channels*, 5 pages.
Classen, Ferdinand, *Frequency Synchronization Algorithms for OFDM Systems Suitable for Communication Over Frequency Selective Fading Channels*, IEEE, 1994, pp. 1655-1659.
Keller, Thomas, *Orthogonal Frequency Division Multiplex Synchronization Techniques for Frequency-Selective Fading Channels*, IEEE, vol. 19, No. 6, Jun. 2001, pp. 999-1008.
Gardner, Floyd, *A BPSK/QPSK Timing-Error Detector for Sampled Receivers*, IEEE, vol. COM-34, No. 5, May 1986, pp. 423-429.
Johansson, Stefan, *Silicon Realization of an OFDM Synchronization Algorithm*, Department of Applied Electronics, Sweden, 4 pages.
van de Beek, Jan-Jaap, *Low Complex Frame Synchronization in OFDM Systems*, IEEE 1995, pp. 982-986.
Schafhuber, Dieter, *Pulse-Shaping OFDM/BFDM Systems for Time-Varying Channels: ISI/ICI Analysis, Optimal Pulse Design, and Efficient Implementation*, Vienna University of Technology, 5 pages.
Pfletschinger, Stephan, *Optimized Impulses for Multicarrier Offset-QAM*, Globecom, IEEE Nov. 25-29, 2001, vol. 1, p. 207-211.
Landström, Daniel, *Time and Frequency Offset in OFDM Systems Employing Pulse Shaping*, IEEE, 1997, pp. 278-283.
Vahlin, Anders, *Optimal Finite Duration Pulses for OFDM*, IEEE, vol. 44, No. 1, Jan. 1996, pp. 10-14.
van de Beek, Jan-Jaap, *Synchronization of a TDMA-OFDM Frequency Hopping System*, IEEE 1998, 6 pages.
Zyren, Jim, *Tutorial on Basic Link Budget Analysis*, Intersil, Jun. 1998, pp. 1-8.
Gardner, Floyd M. *Interpolation in Digital Modems—Part I: Fundamentals*, IEEE, vol. 41, No. 3, Mar. 1993, pp. 501-507.
Erup, Lars, *Interpolation in Digital Modems—Part II: Implementation and Performance*, IEEE, vol. 41, No. 6, Jun. 1993, pp. 998-1008.
Moonen, Marc, *Digital Signal Processing II—Lecture 7: Maximally Decimated Filter Banks Oversampled Filter Banks*, pp. 1-40.
Li, Jian, *Carrier Frequency Offset Estimation for OFDM-Based WLANs*, IEEE, vol. 8, No. 3, Mar. 2001, pp. 80-82.
Larsson, Erik G., *Joint Symbol Timing and Channel Estimation for OFDM Based WLANs*, IEEE, vol. 5, No. 8, Aug. 2001, pp. 325-327.
Miaoudakis, Andreas, *An All-Digital Feed-Forward CFO Cancellation Scheme for Hiperlan/2 in Multipath Environment*, IEEE 2002, 5 pages.
Müller, Stefan E., *Comparison of Preamble Structures for Burst Frequency Synchronization*, Globcom, San Francisco, CA, Nov. 2000, pp. 1488-1493.
Ma, Xiaoli, *Non-Data-Aided Frequency-Offset and Channel Estimation in OFDM and Related Block Transmissions*, IEEE 2001, pp. 1866-1870.
Pompili, Massimiliano, *Channel-Independent Non-Data Aided Synchronization of Generalized Multiuser OFDM*, IEEE 2001, pp. 2341-2344.
Kim, Ki Yun, *Symbol Frame Synchronization Technique for OFDM Burst Mode Transmission*, Sungkyunkwan University, 4 pages.
Kim, Yun Nee, *An Efficient Frequency Offset Estimator for OFDM Systems and Its Performance Characteristics*, IEEE, vol. 50, No. 5, Sep. 2001, pp. 1307-1312.
Langfeld, Patrick, *OFDM System Synchronization for Powerline Communications*, University of Karlsruhe, 8 pages.
Gallardo, Ana, *A Preamble Based Carrier Frequency Estimation Approach for B-FWA OFDM Systems*, Advanced Modulation and Coding Area, Development Programmes Department, Greece, 5 pages.
van de Beek, Jan-Jaap, *A Time and Frequency Synchronization Scheme for Multiuser OFDM*, IEEE, vol. 17, No. 11, Nov. 1999, pp. 1900-1914.
Tufvesson, Fredrik, *Time and Frequency Synchronization for OFDM using PN-Sequence Preambles*, IEEE Vehicular Technology Conference, Amsterdam, The Netherlands, Sep. 1999, pp. 1-5.
Tufvesson, Fredrik, *Time and Frequency Synchronization for BRAN using PN-Sequence Preambles*, Radio Science and Communication, Karlskrona, Sweden, Jun. 14-17, 1999, pp. 1-5.
Litwin, Louis, *The Principles of OFDM*, RF Signals Processing, Jan. 2001, pp. 30-48.

\* cited by examiner

SPECTRAL REUSE TRANSCEIVER-BASED AGGREGATION OF DISJOINT, RELATIVELY NARROW BANDWIDTH (VOICE) CHANNEL SEGMENTS OF RADIO SPECTRUM FOR WIDEBAND RF COMMUNICATION APPLICATIONS

CROSS-REFERENCE TO RELATED APPLICATIONS

The present application is a continuation-in-part of and claims the benefit of previously filed, U.S. patent application, Ser. No. 10/730,753, filed Dec. 8, 2003, by Brent Saunders et al, entitled: "Radio Communication System Employing Spectral Reuse Transceivers" (hereinafter referred to as the '753 application), which claims the benefit of U.S. Provisional Patent Application Ser. No. 60/432,223, filed Dec. 10, 2002, by Gerhardt et al entitled: "Link Utilization Mechanism for Secondary Use of A Radio Band"; and further claims the benefit of previously filed, U.S. Provisional Application Ser. No. 60/784,105, filed Mar. 20, 2006, by E. Gerhardt et al, entitled: "Link Utilization Mechanism for Aggregation of Disjoint Radio Bandwidth," the disclosures of each application being incorporated herein.

FIELD OF THE INVENTION

The present invention relates in general to communication systems and subsystems thereof, and is particularly directed to a radio frequency (RF) communications spectrum usage methodology, that takes advantage of the clear channel assessment and frequency-hopping functionality of the spectral reuse transceiver disclosed in the above-identified '753 application, to effectively aggregate a plurality of disjoint, relatively narrowband (e.g., voice) RF channels into an overall bandwidth for accommodating relatively wideband applications, such as, but not limited to the transmission of data and/or video.

BACKGROUND OF THE INVENTION

A number of (primary) RF spectrum users, such as, but not limited to, public service entities (e.g., police, fire, and utility service organizations), have been licensed by the Federal Communications Commission (FCC) to use one or more, relatively narrowband, radio channels, which were originally intended to support analog voice services (such as push-to-talk radio communications). In a typical spectral distribution of these narrowband channels, such as the non-limiting spectral distribution diagrammatically illustrated in the disjointed channel band 11 in FIG. 1, the channels that have been allocated to a given licensee will likely, over time, include a plurality of different bandwidth segments, such as one or more of 50 KHz, 25 KHz, 12.5 KHz and 6.25 KHz segments, which are not necessarily and are not expected to be mutually spectrally contiguous.

Namely, as shown by the spectral gaps 13, the channels which a primary user will have been licensed to use will typically be separated from one another by one or more other channels or bandwidth segments (gaps 13) that have been licensed to other (primary/licensed) users. The spectral disparity among the licensed channels results from the fact that they have been sequentially licensed to various users in response to incremental allocation requests, on the one hand, and due to the evolution of tighter spectral efficiency requirements that have been promulgated by the FCC to meet the continuously increasing demand for bandwidth.

A principal concern of these licensees is the efficient utilization of their allocated bandwidth. In the case of push-to-talk analog voice services, for example, a substantial number of licensees currently employ fixed-frequency, or manually channelized, radios. Although these radios are relatively inexpensive, they offer poor utilization of the radio channels where they use a dedicated frequency, or pair of frequencies; if the radio is used only ten-percent of the time, ninety-percent of the available bandwidth is wasted. In the above push-to-talk analog voice service example, additional radios could share the various channels of overall allocated segments of bandwidth by employing a 'listen-before-talk' user discipline. While this would improve spectral efficiency, it has the drawback of requiring some users to wait until a frequency becomes clear, or to manually adjust the frequency—if the radio has that capability—and try again.

Trunked radios offer an improvement over these stand-alone radio designs, since they are able to signal a repeater station, which then select a clear channel for the caller. While there are a number of trunking protocols that may be employed, they all share a disadvantage that is also shared by other push-to-talk mechanisms—channelization of the radios cannot be changed, and efficiency of band usage may be low.

The radios described above and other similar radios are inflexible, in that they can be used only for a single, relatively narrowband, channel (such as a 12.5 KHz, 25 KHz or 50 KHz channel), and must remain on that channel for the duration of the communication session—which prevents efficient utilization of the user's allocated bandwidth. Moreover, being relatively narrow bandwidth devices, these radios are unable to provide relatively high bandwidth services, such as Ethernet and Internet Protocol (IP) digital services.

As a result, in order to avail themselves of wideband services, users of such radios will often purchase cellular radio cards, which they can insert into their personal computers and thereby gain access to a cellular network that supports (IP) digital communications. Obvious shortcomings of this approach include the extra expense of the cellular card and service subscription, and having to rely upon a (cellular) network that may overload, or not function at all, in the event of an emergency situation, such as a natural disaster (e.g., hurricane), before, during and after which communications among emergency service organizations are critical.

SUMMARY OF THE INVENTION

In accordance with the present invention, the inability of these and other conventional, relatively narrow bandwidth radios to more efficiently utilize the entirety of the (disjoint spectral channels of) bandwidth that has been licensed to their users is successfully overcome by taking advantage of the multiple subcarrier frequency hopping (MSFH) functionality of the spectral reuse transceiver disclosed in the above-identified '753 application to effectively 'aggregate' such disjointed channels into an overall bandwidth that is considerably wider than any licensed channel, so that the radio may be used for wideband applications, such as the transmission of data and/or video.

In particular, advantage is taken of the clear channel detection and frequency agile functionality of the spectral reuse transceiver of the '753 application to determine which ones of a plurality of disjoint primary channels (that have been licensed to the user or to one or more other users that have agreed to share their licensed channel allocations) are not being used (e.g., have released the push-to-talk buttons of their radios) and, based upon this lack of use detection, to effectively 'aggregate' these multiple disjoint channels into an overall totality of potentially available bandwidth, the spectral extent of which is at least sufficient to meet a prescribed, relatively high bandwidth requirement (such as, but not limited to the transmission of data and/or video), that could not otherwise be satisfied by a conventional, single channel radio.

Typically, only a fraction or subset of this relatively large number of frequency-hopped, narrowband subcarriers or sub-channels into which the aggregated bandwidth is sub-dividable will be required to satisfy the high bandwidth requirement for a given application (such as the transmission of digital data). The frequency agile capability of the spectral reuse transceiver of the '753 application is used to selectively frequency hop among subcarriers or sub-channels of respectively different sub-channel subsets, that are pseudo-randomly assembled from among all of the available sub-channels into which the aggregate band has been sub-divided.

DETAILED DESCRIPTION

Figure 1:
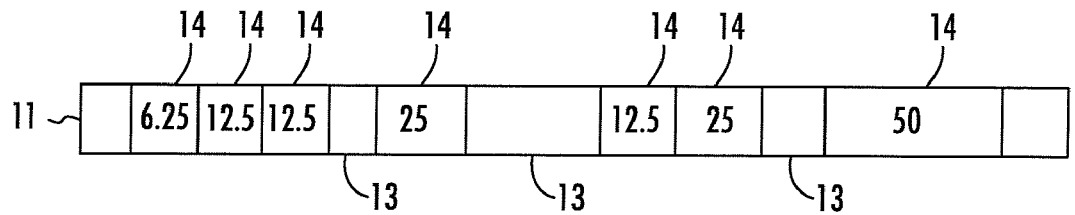
FIG. 1 diagrammatically illustrates a non-limiting example of a distribution of relatively narrowband communication channels of differing bandwidths that may be licensed to a primary user of such channels.

Before describing the details of the disjoint radio channel aggregation methodology of the present invention, it should be observed that the invention essentially involves enabling the spectral reuse transceiver disclosed in the above-referenced '753 application to perform additional functionality—that of effectively aggregating a plurality of disjoint, relatively narrowband (e.g., voice) RF channels into an overall totality of potentially available bandwidth, that is considerably wider than any individual licensed narrowband channel, and is able to accommodate relatively wideband applications, such as, but not limited to the transmission of data and/or video.

As will be described, this additional functionality is readily implemented by simply setting the configuration parameters that are used by the communications controller of the transceiver disclosed in the '753 application to control the operation of the transceiver. The architecture of the transceiver of the '753 application remains unchanged. As a consequence, the present invention has been illustrated in the drawings by readily understandable diagrammatic illustrations, which include a generalized network architecture diagram, and a channel aggregation and sub-channel sub-division diagram, that show only those details that are pertinent to the invention, so as not to obscure the disclosure with details which will be readily apparent to one skilled in the art having the benefit of the description herein.

Figure 2:
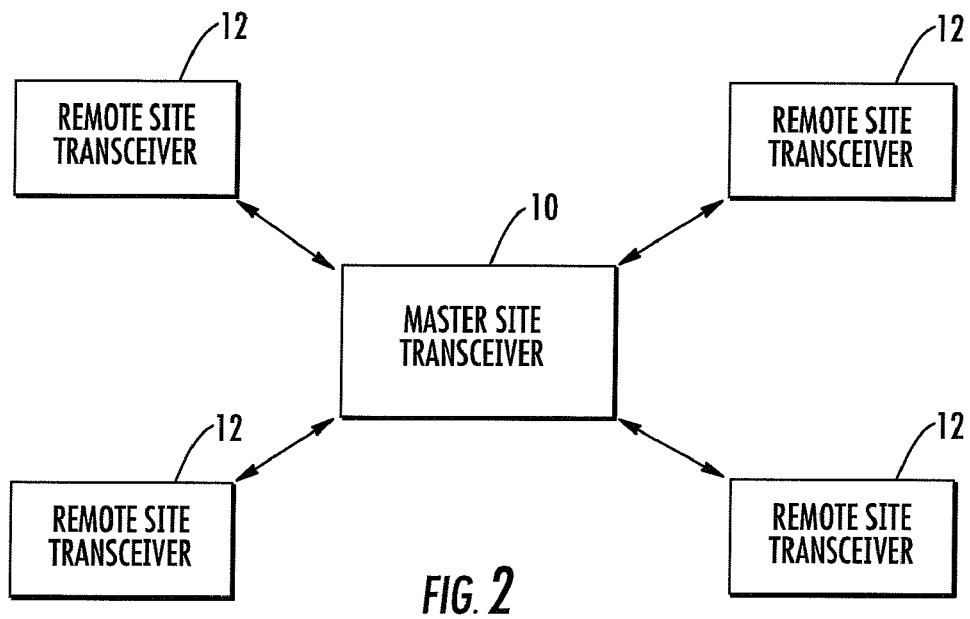
FIG. 2 corresponds to FIG. 1 of the above-referenced '753 application and diagrammatically illustrates the architecture of a communication network, respective terminal unit transceiver sites of which employ the spectral reuse transceiver disclosed in the '753 application.

Attention is now directed to the RF communications network architecture diagram of FIG. 2, which corresponds to FIG. 1 of the above-referenced '753 application. As shown in FIG. 2, the network includes a hub, or 'master' terminal unit site 10, and a plurality of 'remote' terminal unit (RTU) sites 12, at which spectral reuse transceivers of the type disclosed in the '753 application are located. As noted above, except for the manner in which the configuration parameters, used by the communications controllers of these transceivers to control their operation, are predefined in accordance with the primary channel aggregation sub-channel hopping methodology of the present invention, to limit the field of search of the clear channel assessment routine (that is performed by transceiver to locate available sub-channels among which it may hop) to prescribed channels licensed to one or more primary users, the architecture of the transceiver is unchanged.

As the architecture and operation of the transceiver are set forth in detail in the '753 application, they will not be repeated here. Instead, the following description will set forth the manner in which the spectral activity-based link utilization control mechanism employed by the transceiver's communication controller confines its clear channel assessment routine to particularly identified primary channels, in particular, those (typically disjoint) primary channels that have been licensed to one or more prescribed primary users of a given user band (e.g., the 217-220 MHz band), and an aggregation of the respective bandwidth segments effectively produces an overall bandwidth that enables the radio to be used for wideband applications.

To this end, in accordance with the aggregation methodology of the present invention, and similar to the more generalized clear channel assessment routine described in the '753 application, but delimited to the aggregated band of channels licensed to the prescribed primary user(s), the master site periodically initiates a clear channel assessment routine that compiles a list of primary channels available for use in wideband applications by the primary user(s), based upon an examination of only primary communication channels which have been licensed to a specifically identified primary user or users. This primary channel allocation information, which is directly obtainable from the FCC, is used to establish, a priori, configuration parameters of the transceivers of the prescribed primary user(s), so that the clear channel assessment routine will be confined to only the pre-specified channels of interest. The primary channels of the compiled list will thus be those channels of the aggregated band which are not being currently used, and are therefore available to be sub-divided into sub-channels that may be assembled in respective sub-sets of sub-channels for use in a wideband application by the primary channel user(s).

By one or more primary users is meant that the invention may be used to aggregate not only primary channels that have been licensed to a single user, but primary channels that have licensed to plural users who have decided to 'pool' their resources, in order to increase bandwidth capacity. As a non-limiting example, city and county emergency service providers may decide to aggregate their primary channels into a single aggregated band. As described above, since the channels allocated to these users are known, a priori, it is a simple matter of configuring the configuration parameters of the spectral reuse transceiver of the '753 application to limit its search for available frequencies to only those channels that have been allocated to the users of interest. To the transceiver, channels are channels. The transceiver operates on whatever channels are identified in accordance with its configuration parameters.

Thus, as in the case of the transceiver operation described in the '753 application, except when transmitting a message to the master node, each remote user site sequentially steps through and monitors the current list of clear channels (of the 'aggregated' band) that it has previously obtained from the master unit, in accordance with a pseudo random hopping sequence that is known, a priori, by all the users of the aggregated band, for a message that may be transmitted to it by the master site. During a prescribed time interval, such as the preamble period of any message transmitted by the master, each such user's transceiver scans all (6.25 KHz) sub-channels, or frequency bins, within the aggregated band for the presence of RF energy. Any bin containing energy above a prescribed threshold is marked as a non-clear channel, while the remaining channels of the aggregated band are marked as clear channels available for wideband signaling applications.

Whenever a remote site notices a change in its clear channel assessment, it reports this to the master at the first opportunity. When the master site has received clear channel lists from all the remote sites, it logically combines all of the clear channel lists from all the interrogated remote transceivers to produce a composite clear channel list.

This composite clear channel list is stored in the master site's transceiver and is broadcast to all of the remote transceivers over a prescribed one of the clear channels that is selected in accordance with a PN sequence through which clear channels are selectively used among the users of the aggregated channel band. When the clear channel list is received at a respective remote transceiver, it is stored.

In order to ensure that all communications among the users of the network are properly synchronized (in terms of the clear channel list and the order through which the transceivers traverse or 'hop' through the clear channel entries of the list), the master site's transceiver transmits an initialization message on an a priori established clear channel (preamble channel), which each of the remote transceivers monitors. This initialization message contains the aggregate clear channel list, the preamble channel (and the next preamble channel), a PN sequence tap list, and the PN seed that defines the initial channel and hopping sequence for the duration of an upcoming transmit burst. Once a remote transceiver has received an initialization message, that transceiver transitions to normal multiple access mode, as described in the '753 application. For further details of the transceiver with which the invention may be employed, attention may be directed to the '753 application.

Figure 3:
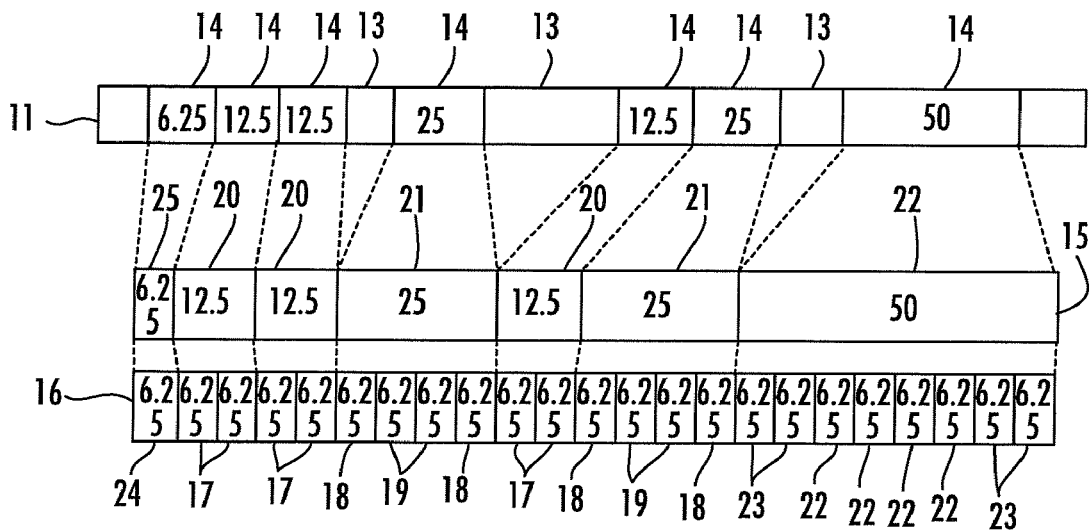
FIG. 3 diagrammatically illustrates the manner in which the plurality of disjoint, different bandwidth user channels of the channel distribution example of FIG. 1 is aggregated into an overall bandwidth or channel space that is subdivided into a plurality of sub-channels, in accordance with the methodology of the present invention.

Attention is now directed to FIG. 3, which illustrates the manner in which the plurality of disjoint and differing bandwidth (50 KHz, 25 KHz, 12.5 KHz and 6.25 KHz) primary user channel segments of the example of FIG. 1, described above, are 'aggregated' in accordance with the present invention into a composite channel space 15, as well as the subdivision of this aggregation of primary channels into an associated plurality of equal bandwidth (e.g., 6.25 KHz) narrowband sub-channels within a sub-divided channel space 16. As described previously, being disjoint user channels means that, within the overall radio band 11, there are one or more additional segments 13 of interleaved bandwidth, not allocated to primary channel licensees, that occupy one or more portions of the radio frequency spectrum between two or more of the primary channels 14 that have been allocated to a prescribed user (or users).

As a result, even though a summation of the individual bandwidths of the respective user channels 14 may produce a relatively large accumulated or total bandwidth which, if continuous, would readily accommodate substantially any type of communication signal (including, but not limited to, high bandwidth video/imagery signals), the interleaved (non-user channel) bandwidth segments 13 cause a fragmentation of the user's overall licensed bandwidth into relatively small bandwidth segments 14, which limits the potential utilization of the overall user channel bandwidth by a conventional fixed-frequency, or manually channelized, radio, described above.

Pursuant to the bandwidth aggregation methodology of the present invention, however, using a priori knowledge of this allocation of the disjointed primary user channels 14 within the primary user band 11, advantage is taken of the clear channel assessment and sub-channel frequency hopping functionality of the transceiver of the '753 application, to enable that transceiver to confine its operational spectrum to only those particular allocated primary user channels 14 within the user's primary channel band 11. As diagrammatically illustrated in FIG. 3, this confinement of the transceiver's operational spectrum may be represented as an aggregation of the individual bandwidths of such channels into a composite channel space 15, in which the respective narrow bandwidth channels 14 within band 11 are shown as being mutually spectrally contiguous with one another, in order to illustrate the considerable overall bandwidth that is available within these channels.

In the illustrated example, therefore, the respective disjoint channels 14 of the primary user channel band 11 of FIG. 1 are shown as being effectively 'mapped' into mutually abutting relationship as an aggregated channel space 15 comprising user channels 25-20-20-21-20-21-22, which, as a whole, represent an overall bandwidth that is considerably wider than any one of the disjoint channels. As shown directly therebeneath, the aggregated channel space 15 is subdivided into a plurality of relatively narrowband sub-channels lying within the sub-divided channel space 16. It is these sub-channels onto which a relatively wideband signal, such as but not limited to a digital data or video signal (the data rate of which is considerably wider than any individual one of of the disjoint narrowband channels 14) is modulated, and among which the transceiver hops during a communication session with the hub or master site, in the manner described in the above-referenced '753 application. It should be noted that the composite spectral representation of the channel space 15 does not mean that the channels 14 themselves have been spectrally shifted or changed so that they become mutually contiguous. The user channels 14 remain unchanged. Rather the composite spectral space illustrates the overall or total bandwidth that the transceiver of the '753 application is able to use for wideband signaling applications, by virtue of its sub-channel frequency-hopping functionality.

In the example of FIG. 3, each sub-channel within the sub-divided channel space 16 has a bandwidth corresponding to that of the narrowest channel bandwidth segment of all the aggregated user channels. In the illustrated example, the narrowest user channel bandwidth segment is 6.25 KHz wide; therefore, each sub-channel within sub-divided channel space 16 is a 6.25 KHz wide sub-channel. As such, within the sub-divided channel space 16, the single 6.25 KHz wide user channel 25 of channel space 15 will produce a single 6.25 KHz hopped sub-channel 24, while each of the 12.5 KHz user channels 20 of channel space 15 will produce a pair of mutually contiguous 6.25 KHz hopped sub-channels 17. In a like manner, each 25 KHz user channel 21 within channel space 15 will produce four sub-channels, that include two 'outer' 6.25 KHz sub-channels 18 that are contiguous with the 'outer' edges of their associated 25 KHz user channel, and two 'inner' 6.25 KHz sub-channels 19, that are contiguous with the center frequency of their associated 25 KHz user channel. Similarly, the 50 KHz user channel 22 of channel space 15 produces two pairs of mutually contiguous 'inner'

6.25 KHz sub-channels 22, and two pairs of contiguous 'outer' 6.25 KHz sub-channels 23.

Now, although the channel space 15 of the illustrated example is shown comprising allocated user channels that have been aggregated from channels lying in a single band, it is to be understood that the continuous channel space may be aggregated from user channels lying in a plurality of bands, without a loss in generality. It should also be noted that the term 'band' is not limited to any particular portion or portions of the radio frequency spectrum. For example, it may cover the entire range of UHF frequencies (the UHF band). In addition, or alternatively, it may also encompass administrative or regulatory subdivisions of larger bands, such as the 420-450 MHz UHF band, or the yet smaller police band within the 420-450 MHz band.

Since the functionality of the transceiver described in the '753 application includes its ability to selectively frequency hop among all (6.25 KHz) sub-channels, or any selected number or sub-set, of the sub-channels of the (aggregated) channel space in a controlled manner, and to modulate an information signal of interest upon these hopped sub-channels, in accordance with the aggregation methodology of the present invention, that transceiver is able to optimize its utilization of the total available bandwidth of all of the disjointed user channels that have been mapped into the aggregated channel space. This provides a significant performance advantage over conventional fixed-frequency or manually agile radios.

For example, because the selective frequency-hopping radio of the '753 application is able to selectively hop among (the sub-divided sub-channels of) the entire aggregated allocation of user channels, it is able to provide a significant gain in throughput efficiency gain afforded by packet multiplexing. In the case of voice applications, for example, conventional analog push-to-talk radios may be unable to complete a call, if the required allocation is not available. Namely, if no 25 KHz user channel is available for a conventional 25 KHz radio, that radio will be unable to place a call, even if there are two or more 12.5 KHz user channels available. On the other hand, because the selective frequency-hopping radio of the '753 application used in the methodology the present invention is able to frequency hop among any of the sub-channels within the aggregated channel space, it is readily able to access the (25 KHz) bandwidth required to complete the call.

It may be recalled that digital radios can provide voice, video and data service capabilities at adjustable or selectable qualities of service and voice or image quality. In addition, spare capacity in the aggregated network may be used for a variety of data services, including Ethernet bridging and IP, which are not be readily available in conventional or trunked analog voice services. The methodology of the present invention enables the functionality of the spectral reuse radio described in the '753 application to aggregate the various licensed users' bandwidths, so that users may enjoy these and other services.

For example, one organization may have only conventional or trunked analog radios, and therefore have no access to digital services, such as Ethernet-bridging, IP (Internet Protocol) applications and others. By using the spectral reuse transceiver system described in the '753 application to aggregate multiple disjoint bandwidth segments, users are able to enjoy digital services. Users can employ the aggregated bandwidth to the extent that is appropriate to a respective organization. For example, users of the aggregated bandwidth may continue to use their analog radios in a normal manner as well as for IP applications. Similarly, users may replace some or all of their analog radios with the radio described in the '753 application, and configured in accordance with the invention to aggregate bandwidth, to take advantage of digital services and more throughput, as needed.

As described briefly above, one example of an allocated user band that is shared by a collection of organizations which, individually, may have a relatively small allocation but, as a whole, has a relatively large allocation, is the 450-470 MHz band in the United States. This band is available to various public safety groups, such as firefighters and police, as well as some businesses and other applications. Aggregating some or all of the band allows all participants in the aggregated bandwidth to have access to a much larger range of dynamic bandwidth and provides for a host of new applications.

One such application involves pooling all public safety allocations; this enables various public safety organizations to continue to use their present radio assets, while adding new ones as needed for new services. An example of such a new service is to provide critical imagery data, such as building drawings, to fire department personnel in real time, prior to having fire-fighters enter a distressed building. Providing imagery data generally requires the use of IP service, which is currently unavailable to many public safety organizations. For example, pooling multiple public service allocations that provide an aggregated bandwidth on the order of 200 KHz will accommodate multiple sub-sets of forty (4 KB) sub-channels, the composite bandwidth of each of which is 160 kilobits, which will readily transport data and/or imagery.

The bandwidth aggregation methodology of the invention may also be used to provide a digital network for providing communications between different public safety organizations (inter-operability). It is presently estimated that such communications will not be widely available in the United States until the year 2023 at a cost of US $60 billion, without a significant change in current planning. Using the present invention to aggregate public safety bandwidth allocations enables inter-operability at the network layer, rather than the physical layer. This provides a significant advantage, since achieving inter-operability using established network protocols (such as IP) is much more obtainable than requiring all devices (from various manufacturers) to have the same radio physical layer. Using the invention to aggregate public safety bandwidth for Internet access will allow police to quickly acquire information about a suspect driver, for example. Providing Internet access in this manner will also supply a conduit for the above-referenced example of making building drawing images available to fire department personnel.

The invention may also be used to aggregate disjointed public safety bandwidth into what may be termed an 'Event Coordination Channel'. Such a channel may be used to provide a special service through which various public safety organizations may obtain information about a public safety 'event', such as a fire, explosion, or hostage situation. Ideally, this Event Coordination Channel comprises a single service that is available to all public service organizations, and serves to produce more complete and consistent information, compared to multiple, parallel services (or worse, no such service). Such an aggregation of bandwidth allows commonly available content management systems (CMSs) having various security levels to be shared, so as to jointly produce event information as it becomes available. The users of this service may select from a list of events on the radio access device to view the information for a specific event.

Aggregating public safety bandwidth allows the radio to fall back to peer-to-peer operation, if the radio cannot reach a radio repeater. This allows local communications at a site where public safety workers are operating. Moreover, because the radio can be managed remotely, priority can be given to selected users, as necessary, e.g., based on circumstances or events. For example, a large building fire may require that bandwidth priority be given to firefighters and certain other public safety groups. A flood, forest fire, terrorist activity, hostage situation, or other event may present new sets of priorities. One method of managing priority is to include an electronic serial number (ESN) in the radio, by which a central management system may set the current priority in the radios in the network. The ESNs may contain sub-fields which identify, for example, the organization, classes and subclasses within the organization.

The radios' repeaters may operate in a repeater-to-repeater mode, as a backup, in case wired-connectivity between repeaters becomes unavailable. This provides increased robustness to the network. The repeaters may continuously poll their neighbors over the wired network and fall back to (possibly reduced bandwidth) radio connections. Another advantage of the invention is that it allows users outside the licensed group to employ the pooled bandwidth on a secondary-use basis. This provides higher utilization of radio bandwidth. In the case of public safety frequencies, the ESN mechanism may be used to disable secondary users during a public emergency.

The interference-detection (clear channel assessment) functionality of the spectral reuse transceiver of the '753 application may also be employed to enable sharing of the continuous channel space resulting from the aggregation of the disjointed user channels by a mixture of conventional and digital radios. As described above, and in the '753 application, although interference-detection is customarily used to avoid interfering with primary licensees, or other, secondary licensees, the interference-detection functionality of the spectral reuse transceiver may be used to detect the activity of conventional radios that employ user channels within the aggregated band on an equal basis with other radios in the aggregated band. Licensees may be motivated to allow a mixture of analog and digital radios due to the cost of complete equipment replacement; thus, some analog radios may continue to operate without change, while the network enjoys the advantages of the present invention, improving spectral efficiency for new installations or replacement radios in a phased replacement program.

As will be appreciated from the foregoing description, by taking advantage of the clear channel detection and frequency agile functionality of the spectral reuse transceiver of the '753 application, the bandwidth usage control methodology of the present invention enables that receiver to effectively 'aggregate' disjoint user channels into an overall totality of potentially available bandwidth, the spectral extent of which is at least sufficient to meet a prescribed, relatively high bandwidth requirement (such as, but not limited to the transmission of data and/or video), that could not otherwise be satisfied by a conventional, single channel-based radio. The frequency agile capability of the spectral reuse transceiver of the '753 application is employed to selectively hop among sub-channels of respectively different sub-channel subsets, that are pseudo-randomly assembled from among all of the available sub-channels into which the aggregate band has been sub-divided.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A method of conducting radio frequency (RF) communications comprising the steps of:
    (a) aggregating a plurality of licensed, differing bandwidth, disjoint RF user channels into an overall RF bandwidth of said disjoint RF user channels, and sub-dividing said overall RF bandwidth into a plurality of RF sub-channels, each having a prescribed bandwidth that is no greater than the bandwidth of each of said licensed, differing bandwidth, disjoint RF user channels;
    (b) identifying clear RF sub-channels within said overall RF bandwidth as those in which the level of RF energy is below a predetermined threshold;
    (c) aggregating at least some of said clear sub-channels into a plurality of subsets having an aggregated RF bandwidth such that no two subsets have an identical aggregated RF bandwidth; and
    (d) controllably hopping among selected ones of said subsets and transmitting a wideband information signal by way of successively hopped ones of said subsets, said wideband information signal having an effective data rate that is greater than the bandwidth of each of said RF user channels comprising said subset.

2. The method according to claim 1, wherein said disjoint RF user channels lie in one or more public service bands.

3. The method according to claim 1, wherein step (d) comprises transmitting an image-representative communication signal by way of said successively hopped ones of said subsets.

4. A method of conducting radio frequency (RF) communications across a network comprising the steps of:
    (a) selecting a plurality of RF channels;
    (b) aggregating said selected channels into an overall RF bandwidth;
    (c) subdividing said aggregated RF channels into a plurality of sub-channels;
    (d) identifying clear sub-channels within said plurality of sub-channels as those in which the level of detectible RF energy is below a predetermined threshold;
    (e) aggregating at least some of said clear sub-channels into a plurality of subsets such that each subset comprises a nonidentical aggregated RF bandwidth;
    (f) providing subset information to each member of said network sufficient to cause each member to transmit and receive using the same clear sub-channels;
    (g) transmitting on said clear sub-channels comprising one of said subsets;
    (h) continuing to transmit while hopping from one subset to another subset within said plurality of subsets.

5. The method claimed in claim 4 wherein said plurality of RF channels is selected from bandwidth segments that have been allocated to one or more primary users.

* * * * *